United States Patent [19]

Kagawa et al.

[11] Patent Number: 4,881,403
[45] Date of Patent: Nov. 21, 1989

[54] SPARK PLUG WITH PRESSURE SENSOR

[75] Inventors: Junichi Kagawa; Yoshiaki Saiki; Kozo Amano, all of Nagoya, Japan

[73] Assignee: NGK Spark Plug Co., Ltd., Nagoya, Japan

[21] Appl. No.: 234,214

[22] Filed: Aug. 19, 1988

[30] Foreign Application Priority Data

Aug. 25, 1987 [JP] Japan .................. 62-209313

[51] Int. Cl.4 .............................................. G01L 9/08
[52] U.S. Cl. ...................................... 73/115; 73/714;
73/754; 73/DIG. 4
[58] Field of Search ................... 73/115, DIG. 4, 754,
73/753, 714, 35; 338/4

[56] References Cited

U.S. PATENT DOCUMENTS 1,861,021  5/1932  Martin .................................. 73/115
2,652,517  9/1953  Van Degrift et al. ................ 73/115
4,169,388 10/1979  Teitelbaum ............................ 73/115

FOREIGN PATENT DOCUMENTS 0401587 11/1933  Japan ..................................... 73/115

Primary Examiner—Donald O. Woodiel
Attorney, Agent, or Firm—Cooper & Dunham

[57] ABSTRACT

A spark plug with pressure sensor comprising; a center electrode having a high voltage terminal; an insulator provided around said center electrode to securely support it; a tubular metallic shell provided to support said insulator at its inner side; a pressure sensor having a piezoelectrical element at least enclosed by a casing of a metallic hollow ring; the metallic shell having a diameter-increased portion and a diameter-reduced portion; the casing of the sensor being inserted into the diameter-reduced portion with an inner side of the casing tightly engaging the outer side of the diameter-reduced portion; a mount means having a ring portion and a flange portion; the ring portion tightly inserted into the diameter-reduced portion while the flange portion tightly sandwiching the casing with a step between the diameter-reduced portion and the diameter-increased portion; and the ring portion being welded to said diameter-reduced portion to maintain air-tight relationship between an innerside of the ring portion and outer side of the diameter-reduced portion.

7 Claims, 3 Drawing Sheets

BACKGROUND OF THE INVENTION

1. Field of the Invention

This invention relates to spark plug equipped with a pressure sensor to detect pressure appearing in a combustion chamber at the time of running an engine so as to transmit it to a micro computer in a form of electrical signal.

2. Description of the Prior Art

This kind of spark plug has been introduced to detect pressure in a combustion chamber. This pressure is transformed into electrical signal by a pressure sensor which controls a timing of ignition and fuel injection with an assist of a micro computer for an optimum output and fuel expense.

The sensor has usually a piezoelectrical element enclosed into a dough-nut shaped casing made from metallic material. The casing is inserted into a diameter-reduced portion of a spark plug to be substantially in integral with the plug.

In this instance a sealant such as for example a fluororubber O-ring is provided between an outer side of the diameter-reduced portion and an inner side of the casing to maintain air-tight relationship therebetween.

At the time of mounting the spark plug, the plug is secured to a cylinder head with the casing tightly sandwiched between a stepped portion of the diameter-reduced portion.

This enables to transmit a precise pressure in a combustion chamber to the piezoelectrical element of the sensor.

The expensive O-ring however is exposed to adverse environment of extremely high temperature so that the O-ring is liable to deteriorate with a long usage of time.

Therefore it is a primary object of this invention to provide a spark plug with pressure sensor which is capable of maintaining a precise pressure detecting function for a long period of time with a relatively simple construction.

Accordingly there is provided a spark plug with pressure sensor comprising; a center electrode having a high voltage terminal; an insulator provided around said center electrode to securely support it; a tubular metallic shell provided to support said insulator at its inner side; a pressure sensor having a piezoelectrical element at least enclosed by a casing of a metallic hollow ring; said metallic shell having a diameter-increased portion and a diameter-reduced portion; said casing of said sensor being inserted into said diameter-reduced portion with an inner side of said casing tightly engaging said outer side of said diameter-reduced portion; a mount means having a ring portion and a flange portion; said ring portion tightly inserted into said diameter-reduced portion while said flange portion tightly sandwiching said casing with a step between said diameter-reduced portion and said diameter-increased portion; and said ring portion being welded to said diameter-reduced portion to maintain air-tight relationship between an inner side of said ring portion and outer side of said diameter-reduced portion.

DETAILED DESCRIPTION OF THE INVENTION

Figure 1:
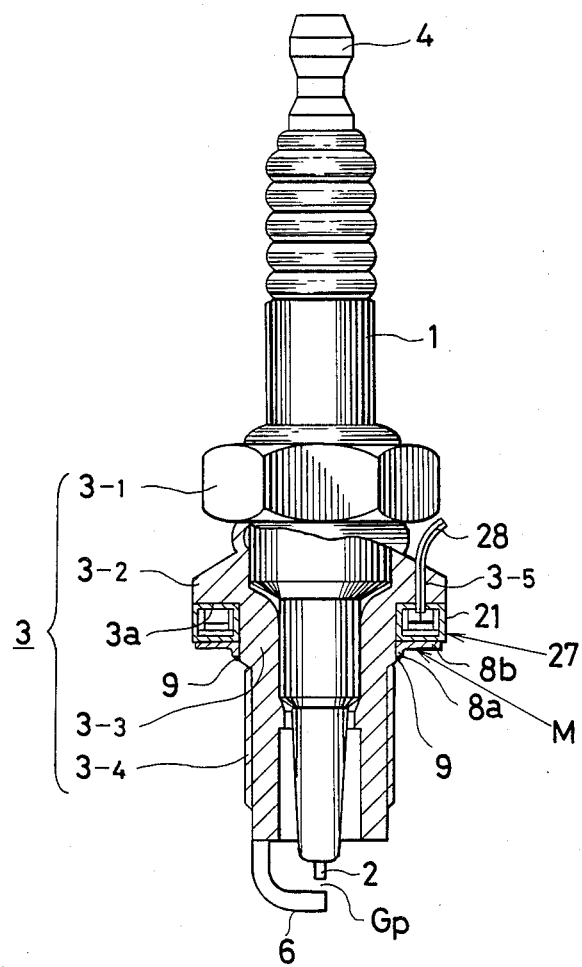
Fig. 1 is a plan view of Spark plug with pressure sensor but partly sectioned.

In reference with especially Fig. 1 of the drawing a ceramic insulator 1 has a center electrode 2 in its inner hollow space. The center electrode 2 has a high voltage terminal 4 at its one end and the insulator 1 is inserted into a metallic shell 3 which provides a hexagonal head 3-1 applied when securing to a cylinder head of an internal combustion engine (not shown) by means of a tool such as for example a wrench. The metallic shell 3 further has a diameter-increased portion 3-2 a diameter-reduced portion 3-3 and a threaded portion 3-4 which is to be screwed to a threaded hole (not shown) formed at the cylinder head at the time of mounting a spark plug.

At the diameter-increased portion 3-2 is a longitudinal throughhole 3-5 provided through which a lead wire 28 is introduced outside from a step 3a defined at a boundary between the diameter-reduced portion 3-3 and the diameter-increased portion 3-2. At the end of the threaded portion 3-4 a L-shaped outer electrode 6 is extended to form a spark gap (Gp) between both the electrodes 6 and 2.

Figure 2:
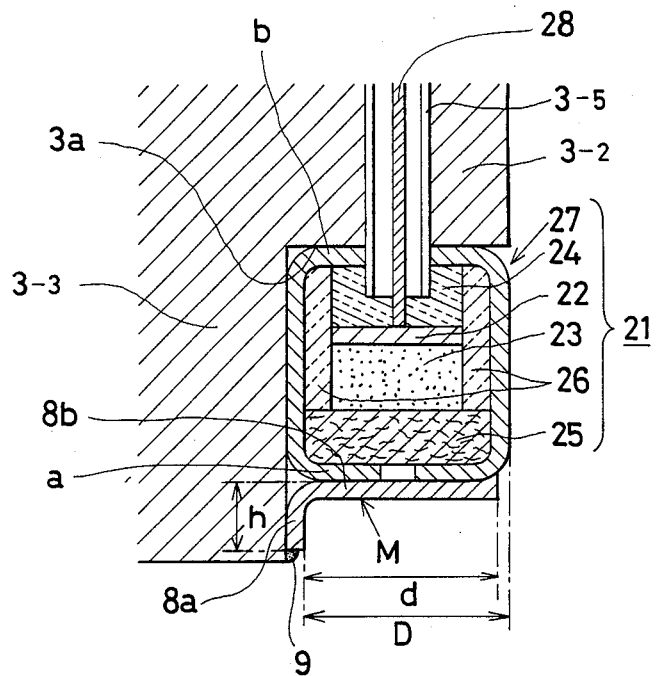
Fig. 2 is a enlarged sectional view of a main part.
Figure 3:
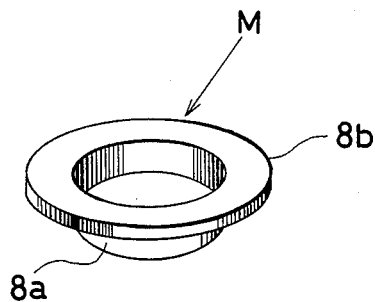
Fig. 3 is a perspective view of a mount means.

A pressure sensor 21 has a metallic casing 27 in a form of hollow ring rectangular in section. The casing 27 of the sensor 21 is inserted to the diameter-reduced portion 3-3 with an inner side of the casing 27 airtightly engaging an outer side of the portion 3-3 . As seen in Fig. 2 into the casing 27 are an inner electrode 22, piezoelectrical element 23, insulator plate 24 and a pressure metal 25 each placed as a lamination through an insulating material 26.

In this instance an upper surface and lower surface of the casing 27 works in turn first and second pressure plates (a), (b). The lead wire 28 is connected at one end to the inner electrode 22 and connected at other end to a micro computer which controls timing of ignition and fuel injection for optimum output and fuel consumption.

Now a mount means as designated at (M) in Fig. 2 has a ring portion 8a and a flange portion 8b to form an angular shape in section as a whole. The mount means (M) inserts the flange portion 8b to the end of the diameter-reduced portion 3-3 in a manner that the flange portion 8b tightly sandwiches the metallic casing 27 with the step 3a.

In this condition the ring portion 8a is secured to the diameter-reduced portion 3-3 by means of laser beam welding as designated at numeral 9 for the purpose of maintaining the air-tight relationship between the inner side of the casing 27 and the outer side of the diameter-reduced portion 3-3.

Instead of the laser beam welding electron beam or seam welding may be employed.

Figure 4:
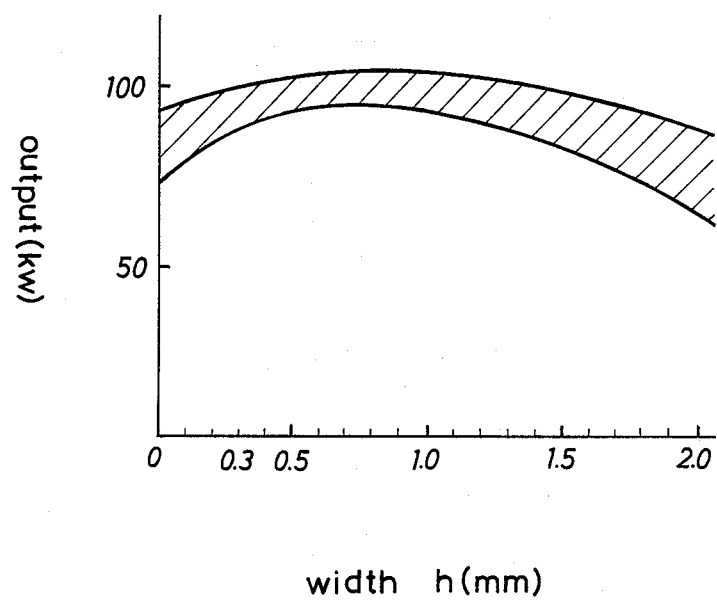
Fig. 4 is a graph showing a relationship between a width (h) and an output of an engine.

The mount means (M) determines width (h) of the ring portion 8a to fall within 0.3~1.5mm. This enables to avoid interference so as to obtain a good air-tight relationship between the casing 27 and the cylinder head when securing the spark plug. According to Fig. 4 which shows the relationship between the width (h) of the ring portion and output [Kw] of engine. This indicates how well the output variation is kept under control within the width range of 0.3~1.5mm so as to maintain good output.

Further a difference between inner diameter of said ring portion 8a and outer diameter of said diameter-reduced portion 3-3 is determined within 0.1mm.

This dimensional relation makes it possible to insert the ring portion 8a snugly without breakage of the casing 27 and prevent loss of air-tight relationship due to a clearance remaining between the diameter-reduced portion 3-3 and the ring portion 8a.

In addition the mount means (M) determines its flange portion 8b less than the casing 27 of the sensor 21 in respect to each outer diameter as designates at (D), (d).

This dimensional arrangement enables to avoid foreign substances from retaining under the flange portion 8b at the time of securing thus lessening a risk of deformation.

As apparently from the foregoing description air-tight relationship between the casing 27 of the sensor 21 is readily found maintained for a long period of time thus enables to provide a dependable spark plug with a relatively simple construction.

With elimination of the O-ring sealant inserting procedure of the O-ring is obviated for easier assemble.

Other arrangements than those described above is identified to those of Fig. 2.

It is noted that instead of the insulating material 26 a mould such as a rubber layer or the like may be used.

Further it is appreciated that the pressure metal 25 may be replaced with an insulator plate.

What is claimed is:

1. A spark plug with pressure sensor comprising;
a center electrode having a high voltage terminal;
an insulator provided around said center electrode to securely support it;
a tubular metallic shell provided to support said insulator at its inner side;
a pressure sensor having a piezoelectrical element at least enclosed by a casing of metallic hollow ring;
said metallic shell having a diameter-increased portion and a diameter-reduced portion;
said casing of said sensor being inserted into said diameter-reduced portion with an inner side of said casing tightly engaging said outer side of said diameter-reduced portion;
a mount means having a ring portion and a flange portion said ring portion tightly inserted into said diameter-reduced portion while said flange portion tightly sandwiching said casing with a step between said diameter-increased portion; and
said ring portion being welded to said diameter-reduced portion to maintain air-tight relationship between an inner side of said ring portion and an outer side of said diameter-reduced portion.

2. In a spark plug with pressure sensor as recited in claim 1 a difference between inner diameter of said ring portion and outer diameter of said diameter-reduced portion is determined within 0.1mm.

3. In a spark plug with pressure sensor as recited in claim 2, said mount means determining its ring portion within a range from 0.3mm to 1.5mm in width.

4. In a spark plug with pressure sensor as recited in claim 2 said mount means determining its flange portion less than said casing of said sensor in outer diameter.

5. In a spark plug with pressure sensor as recited in claim 1 said mount means determining its ring portion within a range from 0.3mm to 1.5mm in width.

6. In a spark plug with pressure sensor as recited in claim 5, said mount means determining its flange portion less than said casing of said senor in outer diameter.

7. In a spark plug with pressure sensor as recited in claim 1, said mount means determining its flange portion less than said casing of said sensor in outer diameter.

* * * * *